Aug. 20, 1968

D. DALIN 3,397,440

METHOD OF MAKING HEAT EXCHANGER HAVING EXTENDED SURFACE

Filed Sept. 30, 1965

Inventor
David Dalin

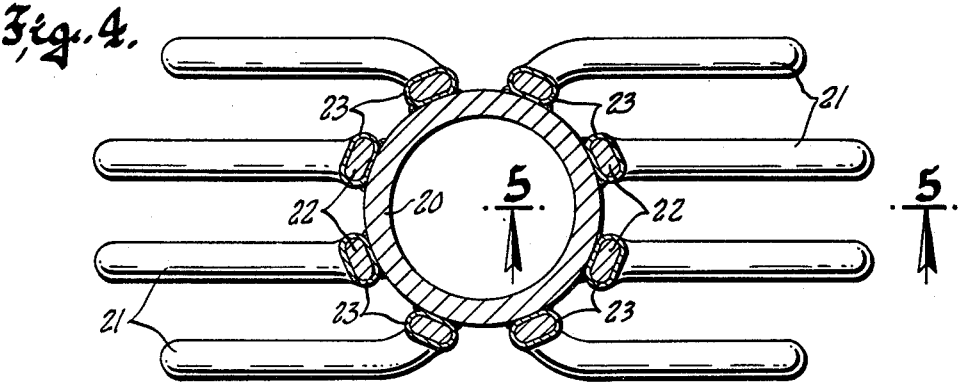
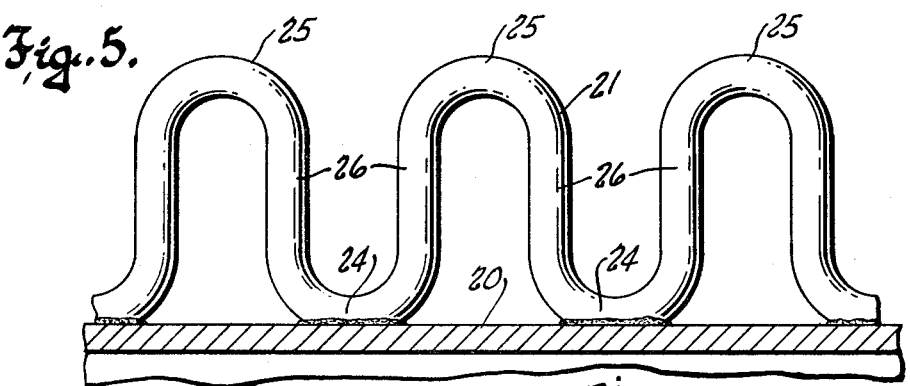
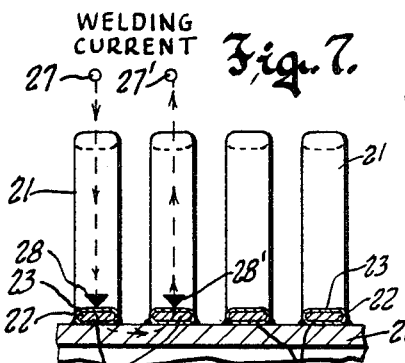
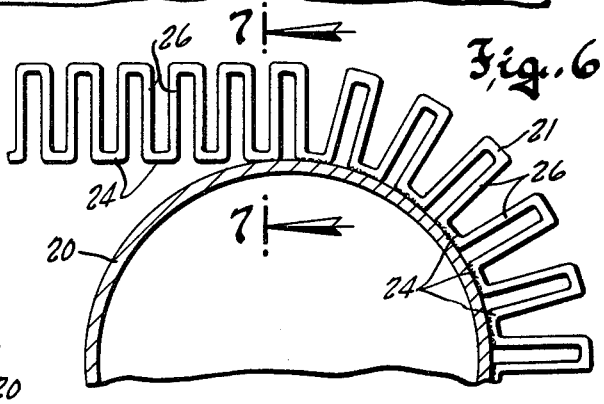
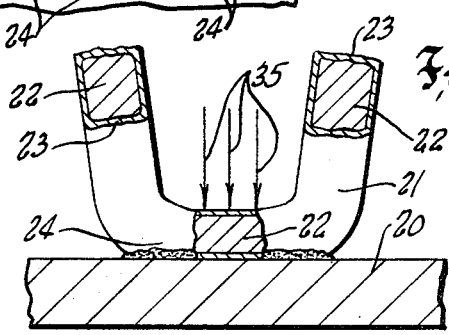

Aug. 20, 1968
D. DALIN
3,397,440
METHOD OF MAKING HEAT EXCHANGER HAVING EXTENDED SURFACE
Filed Sept. 30, 1965
5 Sheets-Sheet 3
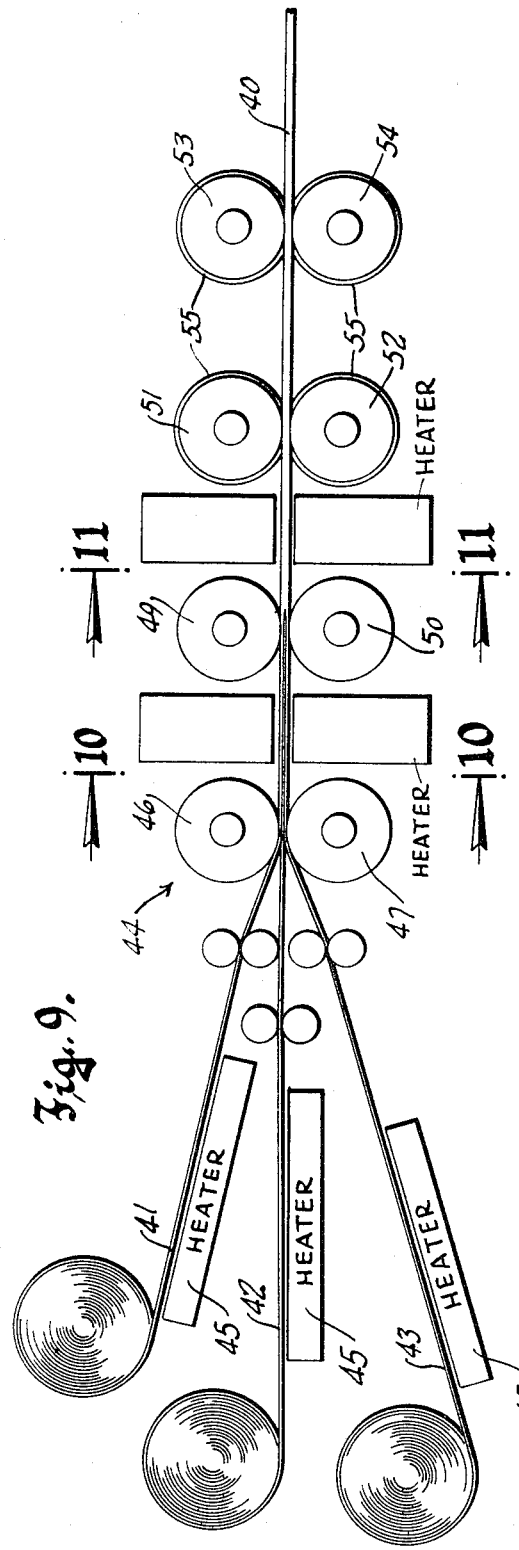
Inventor
David Dalin
By Ira Milton Jones
Attorney

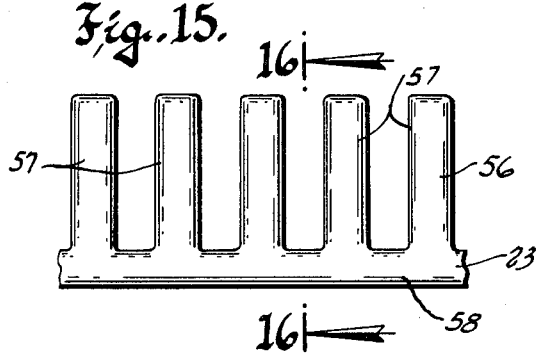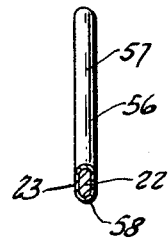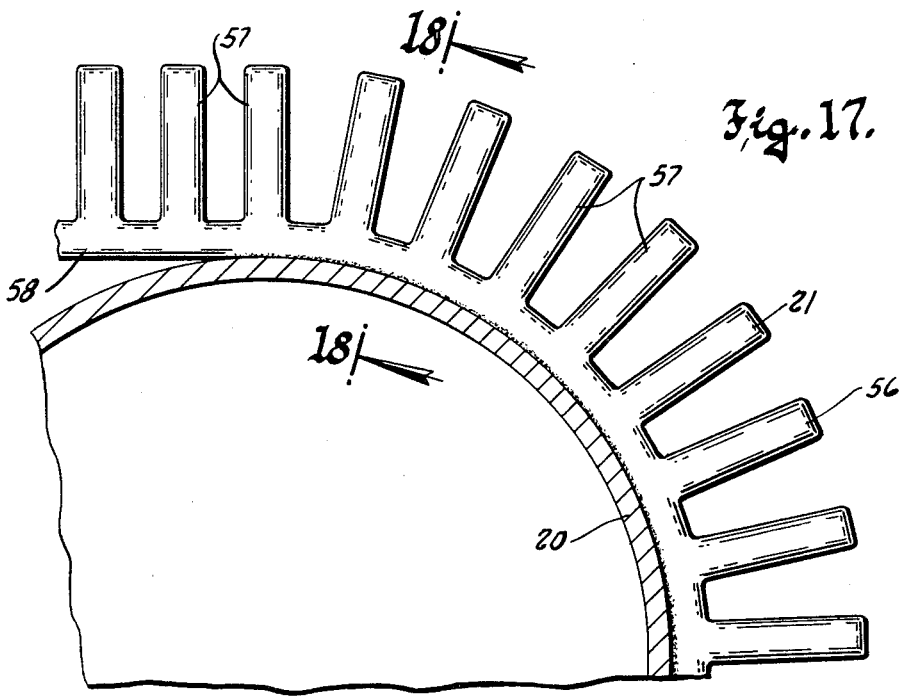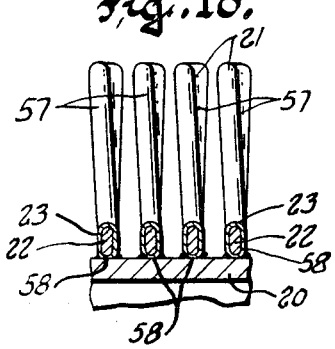

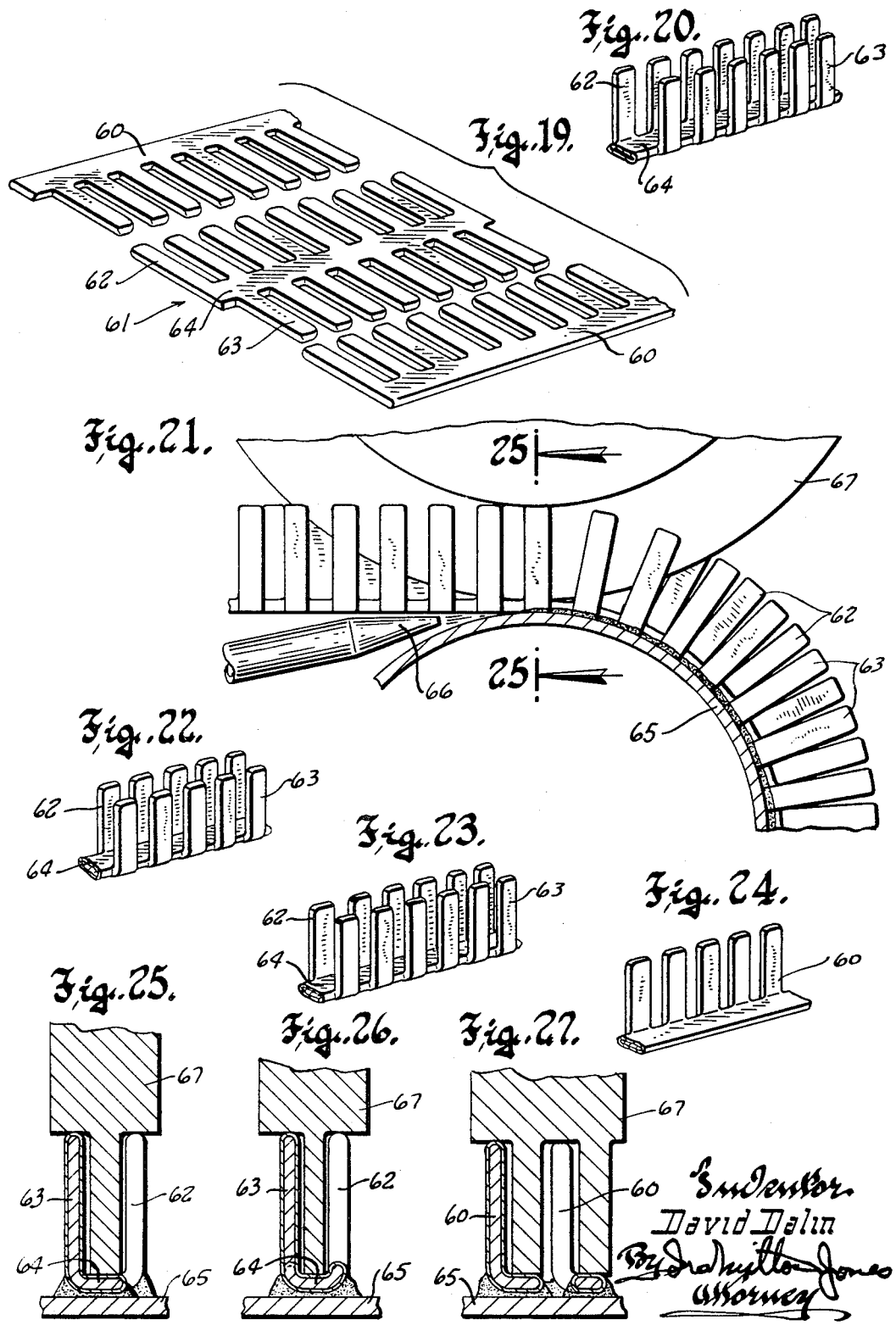

United States Patent Office 3,397,440
Patented Aug. 20, 1968

3,397,440
METHOD OF MAKING HEAT EXCHANGER
HAVING EXTENDED SURFACE
David Dalin, Vensberg, Tosse, Sweden
Filed Sept. 30, 1965, Ser. No. 496,235
5 Claims. (Cl. 29—157.3)

ABSTRACT OF THE DISCLOSURE

A metal wall separating two fluid media has zig-zag bimetallic strips welded to one side thereof to provide extended surface fingers which project perpendicularly from the wall. The bimetallic strips have a core of good heat conductivity metal (copper or aluminum) encased in a sheath of metal possessing good resistance to corrosion (stainless steel). As the bimetallic strips are welded to the wall, sufficient pressure is applied to the portion of the strip being welded to the wall to compact and densify the metal of the core and thereby preclude the formation of voids in the core metal as the weld freezes. In some of the embodiments of the invention illustrated, the bimetallic strips are in the form of combs, in which case it is the backs of the combs that are welded to the wall.

---

This invention, like that of my copending application Ser. No. 484,167, filed Sept. 1, 1965, now abandoned, relates broadly to heat exchangers having extended surface, and refers more particularly to a method of making such heat exchangers.

Specifically, the invention relates to and has as its purpose to provide an improved method of making heat exchangers having extended surface and in which the extended surface is bimetallic, with a core of good conductivity metal within a sheath of corrosion resistant metal.

In heat exchangers of the type with which this invention is concerned, the two fluid media between which indirect heat exchange is to be effected, are separated by a wall of corrosion resistant metal, such as stainless steel. Where both media are gaseous, the partition wall would have extended surface on both sides, but where one of the two media is a liquid, such as a steam-water emulsion, and the other is gaseous, tubes are usually employed to conduct the liquid medium through the heat exchanger and, in this case, the extended surface elements are only on the exterior of the tubes.

Heat exchangers consisting of stainless steel tubes with bimetallic extended surface elements projecting therefrom, are not new in themselves. An example of such heat exchangers will be found in the Dalin Patent No. 2,719,354. But, in these earlier bimetallic extended surface heat exchangers, the extended surface elements generally consisted of individual pins or wires welded endwise to the tube wall. At the ends of these wires the high conductivity core was either exposed or poorly covered, so that despite the corrosion resistant sheath around each individual surface element, exchangers so constructed could not be reliably used in highly corrosive environments.

Moreover, in all past attempts to secure bimetallic extended surface elements to a steel base, success was never attained with extended surface elements in which aluminum was used as the high conductivity core metal. Copper core elements were successfully welded to stainless steel tubes, but notwithstanding all early expectations to the contrary, aluminum core bimetallic elements were never successfully welded to stainless steel tubes. Apparently, when the aluminum was subjected to the high heat incident to the welding operation, some of the adjacent aluminum would be sputtered or blown out of the sheath, and as a result when the molten aluminum again froze, it would crystallize and produce voids at the very place where a dense, solid structure was needed. Hence, even if the steel sheath of the element became attached to the steel tube, the resulting junction lacked the density needed for a good heat conducting connection.

The disappointments to which this past experience with aluminum core extended surface elements led, focused attention upon the need for finding a better way of making heat exchangers equipped with bimetallic extended surface. The attainment of that objective is the purpose of this invention.

With the above and other objects in view which will appear as the description proceeds, this invention resides in the novel procedures and method steps, substantially as hereinafter described and more particularly defined by the appended claims, it being understood that such changes in the precise embodiments of the herein disclosed invention may be made as come within the scope of the claims.

The accompanying drawings illustrate several complete examples or modifications of the invention so far developed for the practical application of the principles thereof, and in which:

FIGURE 4 is a cross sectional view through one t ube of a heat exchanger made in accordance with another modification of this invention;

FIGURE 5 is a fragmentary longitudinal sectional view through FIGURE 4 on the plane of the line 5—5;

FIGURE 6 is a view at an enlarged scale through a portion of a heat exchanger tube, showing one manner in which extended surface may be applied to the tube in accordance with this invention;

FIGURE 7 is a fragmentary sectional view through FIGURE 6 on the plane of the line 7—7;

FIGURE 8 is a sectional view through FIGURE 7, but on a larger scale to illustrate the application of core-compacting pressure on the portions of the bimetallic strip in contact with the tube or base wall;

Figure 1:
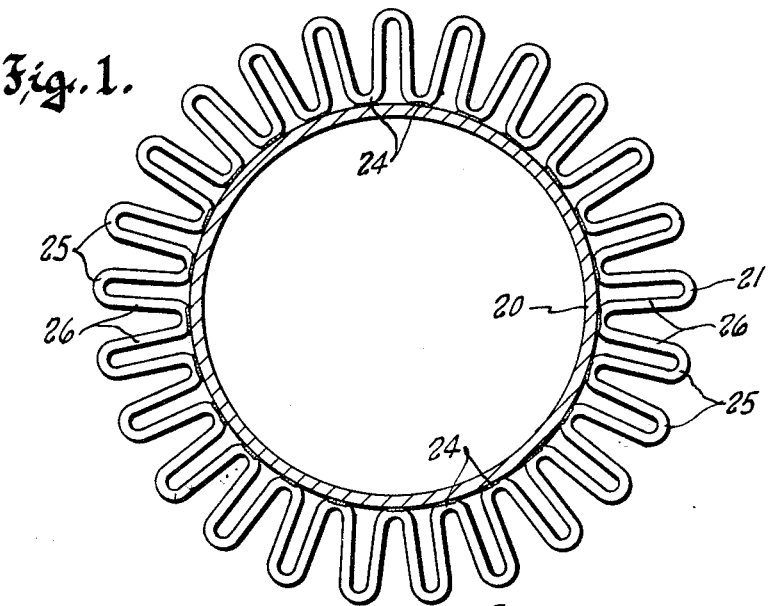
FIGURE 1 is a cross sectional view through one tube of a heat exchanger to which extended surface has been applied in accordance with one way of practicing this invention.

FIGURE 9 diagrammatically illustrates one step in the production of heat exchangers in accordance with one embodiment of this invention, namely, the forming of bimetallic extended surface elements for subsequent attachment to a tube or other base wall;

FIGURE 10 is a detail cross sectional view through FIGURE 9 on the plane of the line 10—10;

FIGURE 11 is a detail cross sectional view through FIGURE 9 on the plane of the line 11—11;

FIGURE 12 is a fragmentary plan view of the bimetallic product produced by the practice of the method diagrammatically illustrated in FIGURE 9;

FIGURE 13 is a detail sectional view through FIGURE 12 on the plane of the line 13—13;

FIGURE 14 is a cross sectional view through FIGURE 12 on the plane of the line 14—14;

FIGURE 15 is a side view of the extended surface strip which results from the practice of the method illustrated in FIGURE 9;

FIGURE 16 is a cross sectional view through FIGURE 15 on the plane of the line 16—16;

FIGURE 17 is a view similar to FIGURE 6, illustrating the manner in which the bimetallic extended surface strip of FIGURE 15 may be applied to a tube;

FIGURE 18 is a fragmentary longitudinal sectional view through FIGURE 17 on the plane of the line 18—18;

FIGURE 19 is a perspective view illustrating a portion of three comb elements simultaneously produced by forming and severing a bimetallic strip or band, two of which are like the comb of FIGURE 15 and the third being what might be considered a "double-edge" comb, since it has teeth projecting in opposite directions from a common back;

FIGURE 20 is a perspective view illustrating how the "double-edged" comb of FIGURE 19 is reformed or shaped preparatory to securement thereof to a base wall to provide extended surface therefor;

FIGURE 21 is a sectional view through a portion of a tube and illustrating one way in which the "double-edged" comb may be secured to the tube;

FIGURES 22 and 23 are views similar to FIGURE 20, illustrating slightly modifide versions of the formed or shaped "double-edged" comb;

FIGURE 24 is a perspective view showing how the single-edged combs of FIGURE 19 may be formed or shaped preparatory to securement thereof to a base wall;

FIGURE 25 is a cross sectional view through FIGURE 21 on the plane of the line 25—25;

FIGURE 26 is a view similar to FIGURE 25, but showing the "double-edged" comb formed or shaped in a slightly different way; and FIGURE 27 is a view similar to FIGURES 25 and 26 to show how two of the single-edged combs, formed and shaped as in FIGURE 24, may be simultaneously secured to a base wall.

Referring now particularly to the accompanying drawings, the numeral 20 indicates a tube of a heat exchanger equipped with extended surface 21. Since the invention is primarily concerned with heat exchangers designed for use at very high temperatures and in corrosive environments, the tube 20 is preferably formed of stainless steel. For the same reason, the extended surface 21 is bimetallic with a core 22 of metal possessing good heat conductivity, such as copper or aluminum, encased in a sheath 23 of stainless steel or similar high corrosion-resistant metal.

Figure 2:
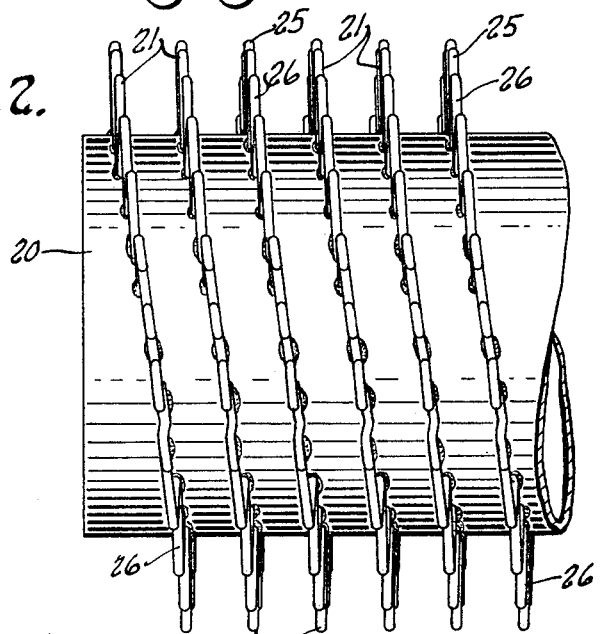
FIGURE 2 is a side view of a short length of the tube shown in FIGURE 1.

In the embodiment of the invention illustrated in FIGURES 1 and 2, the bimetallic extended surface elements are formed from continuous strips, wires, ribbons or bands, formed or shaped into a zig-zag or undulated configuration, and wrapped spirally around the tube with the radially innermost portions or bends 24 thereof secured to the wall of the tube in good heat conducting relation thereto. These inner portions or bends 24, as well as the radially outer portions or bends 25, may be curved or relatively flat, but in any event the inner portions 24 are welded to the outer surface of the tube at regular circumferentially spaced intervals, so that the intervening leg portions 26 form outwardly projecting fingers.

The welding of the inner portions 24 of the bimetallic strips, wires, ribbons or bands to the tube wall may be done by conventional welding technique, or in the manner illustrated in FIGURE 7, wherein the inner portions 24 of two adjacent helically applied strips are connected to the terminals 27—27' of a source of welding current, not shown, by means of electrodes 28—28'. It is, of course, to be understood that the two undulated or zig-zag strips, wires, ribbons or bands are helically wound or wrapped about the tubes with the convolutions of one interposed between the convolutions of the other. Hence, when the inner bend portions 24 of the two strips, wires, ribbons or bands are connected to the terminals of a source of welding current, as shown in FIGURE 7, welding current flows through the intervening section of the tube wall and across the junctions of both inner bend portions 24 therewith.

Figure 3:
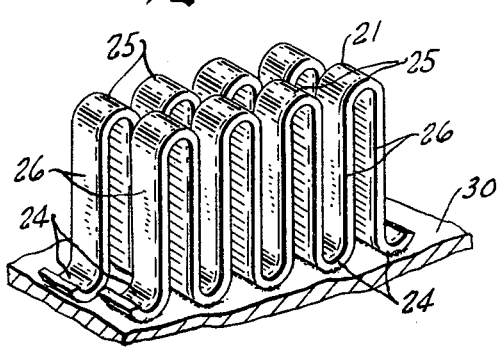
FIGURE 3 is a fragmentary perspective view illustrating another product of this invention, wherein the base wall to which the extended surface elements are secured is flat, through as will be understood, the particular contour of the base wall is of no consequence.

Another way of applying the undulated strips, wires, ribbons or bands to the wall separating the two fluid media between which indirect heat exchange is to take place, is illustrated in FIGURE 3. Here the partition wall 30 (only a small section of which is shown) is flat, and the undulated strips which form the extended surface elements are secured to the wall in adjacent parallel rows, but preferably with their leg portions 26 staggered to ensure a more efficient heat transfer between the extended surface and the fluid media in contact therewith. As before, the inner bend portions 24 of the bimetallic strips, wires, ribbons or bands, are welded to the base wall 30 either by conventional welding technique or in the manner shown in FIGURE 7.

The longitudinally adjacent row arrangement of FIGURE 3 can also be used in the securement of extended surface to tubes, as shown in FIGURES 4 and 5. In this case, the undulated strips, wires, ribbons or bands are welded to the tube in circumferentially equispaced longitudinally extending rows, as shown in FIGURE 5, and then bent to dispose the rows in parallel relationship, as seen in FIGURE 4. This particular arrangement of extended surface on tubes is illustrated in the Dalin et al. Patent No. 2,566,318, and the Dalin Patents Nos. 2,584,189 and 2,719,354.

The important thing from the standpoint of the present invention is that the extended surface elements are not individual pins, as in the aforesaid patents, but are formed of continuous lengths of bimetallic strips, wires, ribbons or bands, so that at no point can the core metal escape from its sheath or be exposed to a corrosive environment.

Another important observation is that wherever the extended surface elements are welded to the base wall— be it a flat wall or the curved wall of a tube—the bimetallic extended surface is deformed or flattened against the base wall. In this manner the core metal of the bimetallic strip, wire, ribbon or band is compacted and densified to assure against any possibility of voids or porosity which experience has shown resulted in the past when bimetallic extended surface elements were welded to a base wall, especially when the core metal was aluminum. Obviously, it is not conducive to good heat transfer to have voids or porosity in the core metal at the very point where good conductivity is essential.

Although the specific manner in which the compaction of the core metal is effected may be safely left to choice, reference may be had to FIGURE 8, wherein the arrows 35 depict the application of compacting pressure on an inner bend portion 24 toward the base wall to deform this part of the bimetallic strip, wire, ribbon or band to the degree necessary to assure compaction of the core metal 22 above the junction of the extended surface with the base wall. This pressure may be applied by a tool which acts on each bend portion 24 directly after the welding operation, or it may be applied by the electrodes 28–28', in which event the electrodes are forced against the bend portions 24 directly after the flow of welding current is interrupted.

The bimetallic strips, wires, ribbons or bands employed in the embodiments of the invention discussed thus far, are of uniform cross section from end to end before they are secured to the tube or base wall and deformed to compact their core metal. Hence they may be produced by the well known wire drawing technique referred to in the Dalin Patent No. 2,719,354. The dies employed in this technique determine the cross sectional shape of the finished product, which may be round, as in FIGURES 4 and 5, or more or less flat, as shown in FIGURES 1–3 and 6–8, inclusive.

Where the wire drawing process is employed to form the bimetallic strips, wires, ribbons or bands, the sheath is inherently unbroken and continuous in cross section, so that no part of the core will be exposed, it being understood that the extreme ends of the strips, wires, ribbons or bands will be suitably sealed by sheath material.

Another way of producing the bimetallic strips, wires, ribbons or bands and of securing them to a tubular base wall, is illustrated in FIGURES 9–18, inclusive. In this case, a relatively wide bimetallic strip or band 40 is first produced by means of the solid-phase bonding technique described, for instance, in the Jost Patent No. 3,095,500. In accordance with that technique, three ribbons 41, 42 and 43 are simultaneously fed from reels or other suitable sources of supply, to a pressure zone indicated generally by the numeral 44, where the three ribbons are pressed together to form a composite bimetallic band. Since the ribbon 42 produces the core of the resulting bimetallic strip or band, it is formed of metal possessing good conductivity—as, for instance, copper or aluminum; whereas the ribbons 41 and 43 which form the sheath for the resulting product, are formed of metal possessing good resistance to corrosion, as for instance stainless steel.

As the three ribbons travel toward the pressure zone 44 they are individually and selectively heated in any suitable manner, as by the diagrammatically illustrated heating elements 45, to prepare the same for solid-phase metallurgical bonding. As explained in the aforesaid Jost patent, the temperature to which the advancing ribbons are heated must be properly controlled, which may be done in any suitable way, as explained in the Jost patent.

At the pressure zone 44, the advancing ribbons 41, 42 and 43 pass between a pair of pressure rolls 46–47, by which the three ribbons are initially compacted and squeezed together and the marginal edge portions of the outer ribbons 41 and 43 are turned in, as at 48 in FIGURE 10.

From the rolls 46–47, the now formed composite strip or band is advanced to a second set of rolls 49–50, and if found necessary the composite band is reheated before it arrives at the rolls 49–50. The rolls 49–50 complete the enwrapment of the middle ribbon 42 by the outer ribbons 41 and 43 which together form a sheath for the core, it being understood that, at this stage, the marginal edge portions of the ribbons 41 and 43 are metallurgically bonded to one another so that the composite strip or band leaving the pressure rolls 49–50 has the cross section illustrated in FIGURE 11.

After the composite strip or band leaves the rolls 49–50, it may be reheated to prepare the same for the shearing and forming operation which follows, and which is effected in two or more stages diagrammatically illustrated by the pairs of rolls 51–52 and 53–54. These rolls have raised knife edges, collectively identified by the numeral 55, of a shape and size such that they coact to shear and form the composite strip or band into a pair of combs 56 (see FIGURE 15), the teeth 57 of which interengage before the combs are separated.

As illustrated by the cross sectional views FIGURES 13, 14 and 16, when the product leaves the shearing and shaping stations represented by the rolls 51–54, all edges of the resulting interengaging combs will be closed or covered by the sheath metal of the ribbons 41 and 43, it being understood that, as in the closure of the marginal edges of the composite strip or band to produce the cross section shown in FIGURE 11, the rolls 51–54, inclusive, coact to form or shape the sheath forming ribbons 41–43 around the sheared edges of the core, and metallurgically bond the sheath metal together.

The bimetallic combs produced in the manner described are applied to the base wall which is to be equipped with extended surface, by suitably welding the back edge 58 of the combs thereto; and where the base wall is a tube, the manner of applying the combs is as illustrated in FIGURE 17 which shows a comb being wrapped around the tube wall and progressively secured thereto by welding the back edge 58 to the tube wall. As this is done, the teeth 57 of the comb will assume radially projecting positions and, if desired, the teeth may be twisted, as shown in FIGURE 18, to provide a more efficient disposition of the resulting extended surface fingers from the standpoint of heat transfer between the fingers and a fluid medium flowing over the tubes.

At the time the combs are welded to the tube, or directly thereafter, pressure must be exerted towards the tube wall on the inner edge portions of the comb back, i.e., the portions of the comb between its teeth, to compact the core metal for the reasons noted.

The manner of forming and shearing the composite strip or band depicted in FIGURES 12–14 simultaneously produces two identical combs. It is also possible, if desired, to so form and shear the composite strip or band as to simultaneously produce not only two combs like the one shown in FIGURE 15, but also a "double-edged" comb having teeth projecting in opposite directions from a common back. The product of this alternate manner of forming and shearing the composite strip or band is illustrated in FIGURE 19, which shows two identical combs 60 which, like the combs 56 (in FIGURE 15) have but one row of teeth, and a "double-edge" comb 61 having two rows of teeth 62 and 63 facing in opposite directions from a common back 64. For clarity of illustration, the three combs are shown separated in FIGURE 19, but it should be understood that until they are so separated the teeth of the three combs interengage.

It should also be noted that the relative disposition of the teeth 62 and 63 is a matter of choice. They may be staggered, as shown in FIGURE 19, so that the teeth 62 are in direct alignment with the spaces between the teeth 63, they may be directly opposed to one another, or they may be partially offset from one another. FIGURE 20 shows the teeth 62 and 63 in completely staggered relation, in FIGURE 22 the two rows of teeth are partially staggered, and FIGURE 23 shows them directly opposed. Each arrangement has its particular virtues from the standpoint of heat transfer between the extended surface elements formed by the teeth and a gaseous medium flowing across them. In every case, however, the comb 61 is bent along lines adjacent to the roots of the teeth 62 and 63 to dispose the teeth perpendicularly to their common back 64, as shown in FIGURES 20, 22 and 23.

Because of the flat underside of its common back 64, the "double-edged" comb 61 is easily secured to a base wall, one way of doing so being shown in FIGURES 21 and 25. As here shown, the base wall is a tube 65 and the comb 61 is wrapped helically around it, the securement being effected by projecting molten welding metal from a nozzle 66 between the tube wall and the back of the comb as the tube is rotated and the comb pressed against it. The needed pressure can be provided by a flanged roll 67 which bears against the outer ends of the teeth 62–63 and also against their common back 64.

As will appear from a comparison of FIGURES 25 and 26, the bend lines along which the "double-edged" comb 61 is bent to dispose its two rows of teeth perpendicularly to their common back 64 may be so spaced that its entire width or only the medial portion thereof is secured to the base wall. In either case, a good junction between the extended surface provided by the "double-edged" comb 61 and the base wall is assured.

The "single-edged" combs 60 may be secured to a base wall in the manner shown in FIGURE 17, that is, with the back thereof disposed edgewise and perpendicular to the base wall, or—if desired—the combs 60 may be bent to enable the back thereof to have flat engagement with the base wall, as shown in FIGURES 24 and 27.

Forming the extended surface elements from a composite strip or band produced in the manner hereinbefore described and illustrated in FIGURES 9, 10 and 11, has the advantage of easily adapting the extended surface to implementation of the invention disclosed and covered in the copending application of David Dalin, Ser. No. 473,336, filed July 20, 1965, now abandoned. That invention resides in the concept of proportioning the amount of high conductivity metal used in the extended surface elements to the temperature of the gases to which they are exposed, to thereby reduce the cost of the extended surface needed to achieve maximum heat transfer in any particular heat exchanger. To be more explicit, the invention of the aforesaid application contemplates dividing the total extended surface into groups differing from one another only in the thermal conductivity of their respective individual elements, and so arranging the several groups of extended surface elements that the group made up of elements having the greatest thermal conductivity, i.e., containing the maximum amount of high conductivity metal, is subjected to the hottest gases, while the group having the least thermal conductivity is located where the temperature of the gases is lowest. But this proportioning must be done without appreciable change in the external size and shape of the individual extended surface elements.

The desired gradation in amount of high conductivity metal without appreciable change in the external size and shape of the individual elements, can be very easily obtained with this invention by simply rolling the laminated or composite strip to different thicknesses. Combs made from the thicker strips will thus have more high conductivity metal in their teeth—which, of course, constitute the extended surface elements—than combs made of thinner strips, while the external size and shape of all of the teeth will remain substantially the same. The area of the flat sides of the teeth will be identical, and since the area of the edges of the teeth is but a very small percentage of the area of their flat sides, the difference in total area between the thickest and the thinnest teeth will be inconsequential.

As will no doubt be realized, the cross sectional shape of the composite bimetallic strip from which the extended surface elements are formed, to a large extent is a matter of choice, and to cover the various possibilities, the terms "strip," "wire," "ribbon" and "band" have been used to describe the same. However, to avoid the use of alternative expressions in the claims, the term "strip" will be employed therein with the understanding that it embraces all of the different cross sectional shapes in which this elongated bimetallic stock may be formed. It should also be understood that where the claims speak of forming the strip into spaced apart but connected fingers, this language covers the severance of the bimetallic band into a single comb or into a plurality of combs, as depicted in FIGURES 12 and 19, as well as it does the bending of a strip of uniform cross section into a zig-zag or undulated configuration.

From the foregoing description, taken in connection with the accompanying drawings, it should be apparent to those skilled in this art that this invention provides a significant improvement in the method of making heat exchangers equipped with extended surface, and particularly heat exchangers intended for use in extremely high temperature and corrosive environments.

I claim:

1. The method of making a heat exchanger for indirect transfer of heat between two fluid media separated by a heat conducting wall, which comprises:
    (a) forming an elongated bimetallic strip having a core of good conductivity metal encased in a sheath of metal possessing good resistance to corrosion;
    (b) forming the elongated bimetallic strip into a row of spaced apart but connected fingers with each finger completely encased in its sheath;
    (c) welding the bimetallic strip to the wall with its fingers projecting from the wall as extended surface; and
    (d) substantially concomitantly with the welding step, while the portion of the bimetallic strip being welded to the wall is soft, pressing the bimetallic strip solidly against the wall with sufficient force to compact and densify the metal of the core at the junction of the strip with the wall to such an extent as to preclude the formation of voids in the core metal as a result of the welding.

2. The method of claim 1, wherein the forming of the bimetallic strip into spaced fingers is effected by bending the same into a series of undulations.

3. The method of making a heat exchanger for the indirect transfer of heat between two fluids media which comprises:
    (a) providing a metal tube through which one of the fluid media passes;
    (b) forming a bimetallic strip having a core of good conductivity metal encased in a sheath of metal possessing good resistance to corrosion;
    (c) forming said bimetallic strip into a succession of undulations;
    (d) wrapping the undulated strip helically around the tube with the radially inner bends thereof in contact with the tube wall and with the portions of the strip between the undulations projecting substantially radially from the tube;
    (e) welding the radially inner bends of the undulated strip to the tube wall; and
    (f) concomitantly with the welding of said inner bends to the tube wall, pressing said bends against the tube wall with a force sufficient to compact the core metal thereat to such an extent as to preclude the formation of voids in the core metal as a result of the welding.

4. The method of making a heat exchanger for the indirect transfer of heat between two fluid media, which comprises:
    (a) providing a metal tube through which one of the fluid media passes;
    (b) forming a plurality of bimetallic strips, each having a core of good conductivity metal encased in a sheath of metal possessing good resistance to corrosion;
    (c) forming each of said bimetallic strips into a succession of undulations;
    (d) wrapping two of said undulated strips helically around the tube, with the convolutions of one strip interposed between those of the other;
    (e) connecting adjacent radially inner bends of the two strips to the opposite terminals of a source of welding current and pressing said inner bends against the tube wall;
    (f) passing welding current through the resulting circuit which includes the intervening portion of the tube wall and the junctions of said two bends with the tube wall, to thus weld said two inner bends to the tube wall; and
    (g) substantially concomitantly with the welding step, exerting sufficient pressure on the inner bends towards the tube wall to compact the core metal thereat to such an extent as to preclude the formation of voids in the core metal as a result of the welding.

5. The method of making a heat exchanger for the indirect transfer of heat between two fluid media separated by a heat conducting partition wall, which comprises:
    (a) forming a plurality of similar undulated strips of metal each having inner and outer bends;
    (b) applying two of said undulated strips to the wall with the inner bends thereof firmly in contact with the wall and with the intervening portions of the undulated strips projecting from the wall;

(c) connecting one of the inner bends of each strip with one of the opposite terminals of a source of welding current to form a circuit which includes the junctions of said inner bends with the partition wall and the intervening portion of the wall; and (d) passing a welding current through said circuit to thus weld the inner bends to the partition wall.

References Cited

UNITED STATES PATENTS

| | | | |
|---|---|---|---|
| 2,793,718 | 5/1957 | Pajak | 29—475 X |
| 2,824,212 | 2/1958 | Roberts | 29—157.3 X |
| 3,021,804 | 2/1962 | Simpelaar | 29—157.3 X |
| 3,045,979 | 7/1962 | Huggins et al. | 29—157.3 X |
| 3,053,511 | 9/1962 | Godfrey | 29—157.3 X |
| 3,220,107 | 11/1965 | Clark | 29—475 X |
| 3,226,808 | 1/1966 | Thomas | 29—157.3 |
| 3,288,209 | 11/1966 | Wall et al. | 29—157.3 X |
| 2,372,795 | 4/1945 | Rodeck | 113—118 |
| 2,807,074 | 12/1957 | Schroeder | 29—157.3 |
| 2,926,421 | 3/1960 | Sandberg | 29—501 X |
| 3,158,122 | 11/1964 | De Give | 29—157.3 |

JOHN F. CAMPBELL, *Primary Examiner.*

D. C. REILEY, *Assistant Examiner.*